G. P. Clarke.
Steam-Engine Recorder.
Nº 77,584. Patented May 5, 1868.
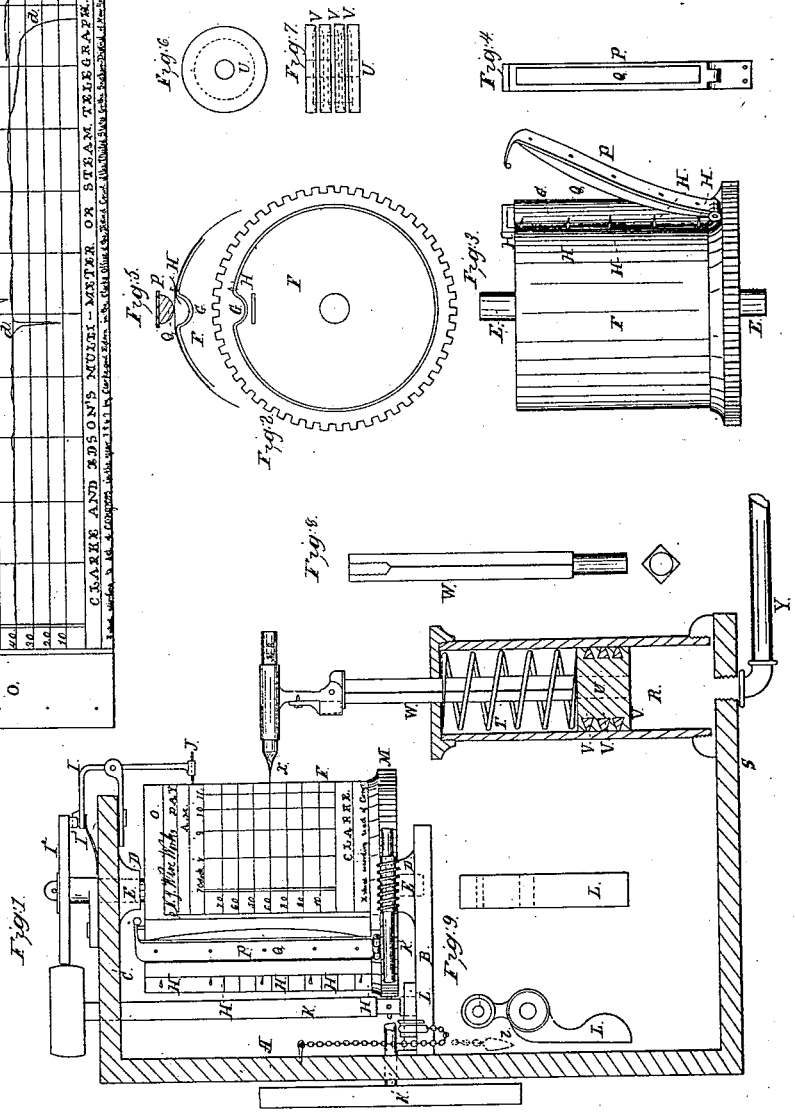
Witnesses:
G. H. Carsun
Geo. W. Francis.
Inventor:
George P. Clarke
Marmont B. Edson

United States Patent Office.

GEORGE PEMBERTON CLARKE, OF NEW YORK, AND MARMONT B. EDSON, OF BROOKLYN, NEW YORK.

Letters Patent No. 77,584, dated May 5, 1868.

IMPROVEMENT IN REGISTERS FOR STEAM-ENGINES

The Schedule referred to in these Letters Patent and making part of the same.

TO ALL WHOM IT MAY CONCERN:

Be it known that we, GEORGE PEMBERTON CLARKE, of the city of New York, in the county of New York, and State of New York, and MARMONT B. EDSON, of the city of Brooklyn, in the county of Kings, and State of New York, have invented an instrument which we term a Multi-Meter, or Steam-Telegraph, for the purpose of registering the duties performed by a steam-engine and boiler combined; and we do hereby declare that the following is a full and exact description thereof, reference being had to the accompanying drawing, and to the letters of reference marked thereon.

The nature of our invention consists in producing an instrument, which we term a multi-meter, or steam-telegraph, by means of which we are enable to record, on a printed blank or chart, the duties performed by a steam-engine and boiler combined, during the period of a working-day, or week, or month, or trip of a ship or locomotive-engine, indicating the pressure of steam every minute, the fluctuations of steam every hour, the revolutions of the engine hourly and daily, the irregularity of motion of the engine, the irregularity of firing, the starting and stopping-points, a check on the safety-valve and steam-gauge, the inattention to duty of the engineer or firemen, the previous unknown pressure, a constant reference of what is required, of what is performed, of what is left undone, and a reliable witness at court, telling the jury the truth in every instance, and producing duplicate copies of the same.

To enable others skilled in the art to make and use our invention, we will proceed to describe its construction and operation.

Figure 1 represents our multi-meter complete.

Figure 2 represents an end view of the roller F, upon which the printed blank or chart is placed, and the recess G, into which the spring-pad P Q forces the slack paper in its place.

Figure 3 represents an elevation of the roller F, showing the mode of connecting the spring-pad P Q with the roller F.

Figure 4 represents a plan of the spring-pad P Q, with hinge.

Figure 5 shows the position of the spring-pad P Q when in the act of forcing the slack paper in the recess G.

Figures 6 and 7, views of the piston U, showing the dove-tail recesses for the water-packing V V V.

Figure 8, view of the square piston-rod W.

Figure 9, views of the movable journal-box L.

Figure 10 represents the printed blank or chart O.

Its Construction.

We construct a frame, A, fig. 1, upon which we place two brackets, B C, and journal-boxes D D, in which a spindle, E, and roller F are made to turn. In this roller F we make a semicircular recess, G, and insert the pins H H, for purposes hereinafter mentioned. We next place on the bracket C, a crooked lever, I, to which is attached a needle-point or pencil, J, for the purpose of pricking or marking an hour-point on the printed blank or chart O, figs. 1 and 10. As the roller F, fig. 1, turns on its axis, the lever I is acted upon by the hour-wheel $I^2$, connected with any ordinary clock-movement, this lever being held in its proper position by the spring $I^3$. We next place the spindle K or K', fig. 1, as the case may be, in contact with the cog-wheel M, fig. 1, which is on the bottom of the roller F, for the purpose of giving motion to said roller F, by means of belts or chains, or cog-wheels, or shafting, or any ordinary mode known to mechanics, directly from the engine.

We next construct a journal-box, L, fig. 9, which secures the lower end of the spindle K in position, said box being made movable by turning on the pin N, fig. 9, in order to move the lower end of spindle K out of gear, by means of the wedge or key $l$, fig. 1, from the cog-wheel M, fig. 1, thus allowing the roller F to freely turn on its axis, for the purpose of placing the chart O in its place.

We next attach to the roller F, a spring, P, fig. 3, covered with a pad, Q, and made of any flexible or elastic material, and connected with the roller F by the hinge on the lower end, this spring-pad P Q being used for the purpose of securing the chart O, fig. 10, to the roller F, fig. 1, in connection with the pins H H H H. The said pad being pressed into the recess G, will necessarily take up all the slack of the paper chart O, after being passed around the roller F, and secured by the pins H H H H, fig. 3. We next place a steam-cylinder, R, on the bottom of the frame A, at S, fig. 1, into which the spring T and piston U are placed; this piston U, figs. 6 and 7, being constructed with dove-tail grooves V V V, said grooves being receptacles for the deposit of greater quantities of water than square grooves, thus forming a better packing, which, being greater in capacity, will require a longer time to fill, from the gradual leakage which takes place in all ground pistons depending upon water for packing.

We next construct a square piston-rod, W, fig. 8, attached to the piston U, said rod passing through the cover of the cylinder R, fig. 1, fitting in a corresponding square hole in said cover, the object of which is to prevent the pencil or point X, fig. 1, from turning when in use. The pencil-holder being of the ordinary kind used in indicators, is secured to the upper end of the rod W, fig. 1, and so arranged as to be convenient to the chart O around the roller F, while recording the condition of the engine and boiler as the pressure increases or diminishes.

A steam-pipe, Y, fig. 1, is attached to the cylinder R, which supplies it with steam directly from the boiler.

Having explained and described each piece and part, we will now proceed to put our instrument together.

Its Operation.

The frame A, fig. 1, being properly shaped, the movable box L, fig. 9, is placed in position by the pin N. The roller F, figs. 2 and 3, is now put in the journal-boxes D D, fig. 1, and arranged so as to turn freely on its axis, after which the steam-cylinder R, fig. 1, with the piston, spring, and square piston-rod, is attached to the frame A, at S, fig. 1, and the pencil with pencil-holder being adjusted so as to perform its duty on the chart O. The hour-wheel $I^2$, fig. 1, is now placed in position, with the clock-movement attached immediately above the wheel $I^2$. The crooked lever is now arranged so that the point J will touch the space on the chart O marked "7 o'clock," 8, 9, and so on. The steam-connection being completed by means of the steam-pipe Y, fig. 1, the communication from the engine being made to the driving-spindle K, fig. 1, for the purpose of turning the roller F. All of the above being properly arranged, we are now prepared to place upon the roller K the chart O, in the following manner:

Place the chart O, fig. 10, around the roller F, with the ends of the paper on the pins H H H H, fig. 1. The spring-pad P Q is now brought to bear upon the paper, and pressed into the recess G, which effectually takes up all the slack around the roller F, making the paper tight and smooth for the operation of the pencil.

When duplicate copies of the chart are required, we place under the printed chart O, carbonized paper, such as is used for manifold-writing, and then substitute a tracing-point, instead of the pencil X, fig. 1, which operation will produce as many copies of the chart O as there are papers under the printed blank.

Everything being now properly adjusted, the key or wedge $l$, fig. 1, being pulled out from the movable journal-box L, thus placing the roller F in gear, and in direct communication with the engine, the steam from the boiler is now admitted through the pipe Y. The pencil or point X ascends, making the vertical line, as seen at "7 o'clock," fig. 10, thus indicating the pressure of steam in the boiler, as forty pounds.

The required pressure being attained, the hour of 7 o'clock having arrived, the engine is started, the roller F revolves from right to left, and the pencil X traces the horizontal line 40, showing uniform pressure of steam in the boiler, and regularity of motion of the engine, provided the engine has made the requisite number of turns per minute to move the roller F the stated distance between 7 and 8 and 9 o'clock, fig. 10. When the engine has failed to make the requisite number of revolutions, the pencil will stop short of 12 o'clock, as seen at $a$, fig. 10. When it has made more turns than has been calculated, the pencil will move past 12 o'clock, as seen at $b$. When the engine has stopped between hours through some accident, the pressure will increase, and the short vertical line $c$ will be made. When the engine is reversed, as on board of steam-vessels, the loop $d$ is made. When the engineer opens the damper before firing, the curve $e$ will be made. When he fires without opening the damper, the curve $f$ will be made, and so on through all the changes made at any time during the day or trip with the engine or boiler.

The point J, fig. 1, governed by the hour-wheel $I^2$, is intended to produce a positive hour-mark, in connection with the calculated hour-line, as seen by the pricked point over 8 o'clock, fig. 10, thus showing that the engine and clock move in unison, or as seen at 9, showing that the engine has moved too slow, or as seen at 10, showing that the engine has moved too fast, thus being a constant monitor looking after the speed of the engine hourly. Hence we employ three agents to produce the desired effect, viz, the pressure of steam direct from the boiler, giving a vertical motion to the pencil; second, the motion of the roller F directly from the engine, giving the horizontal direction to the pencil-marks; third, the hour-wheel $I^2$, being acted upon directly by a clock-movement giving the positive hour, the three combined agencies making our instrument a complete tell-tale or steam-telegraph, and the charts when produced will be the best evidence of the capability of the engineer, and his attention to duty.

We do not confine ourselves to the use of one roller only, but, in the case of a long voyage of a steam-vessel, or to keep the record of a month or more, we reserve the right to use two rollers, and a continuous strip of paper.

Claims.

1. The semicircular recess G, in combination with the pins H H and roller F, substantially as and for the purpose set forth.

2. The construction and application of the spring-pad P Q, in combination with the recess G, pins H H, and roller F, substantially as described.

3. The construction and application of the movable journal-box L, for the purpose set forth.

4. The application of the square piston-rod W, in combination with the pencil-holder, for the purpose herein shown and described.

5. The application of the hour-wheel I², in combination with the crooked lever I, substantially as herein described and set forth.

6. The production of the delineations on the charts O, fig. 10, by the combined action of the motion of the engine, and the direct pressure of the steam from the boiler, and the action of the clock-movement, the conjoint action of these several agencies producing the desired result, substantially as and for the purpose set forth.

GEORGE P. CLARKE,
MARMONT B. EDSON.

Witnesses:
CHARLES NETTLETON,
M. AHEARNE, Jr.